Dec. 14, 1926.  1,611,098
O. L. BORNER
METHOD AND MEANS FOR TREATING GRANULATED MATERIAL
Filed Sept. 7, 1923 2 Sheets-Sheet 1
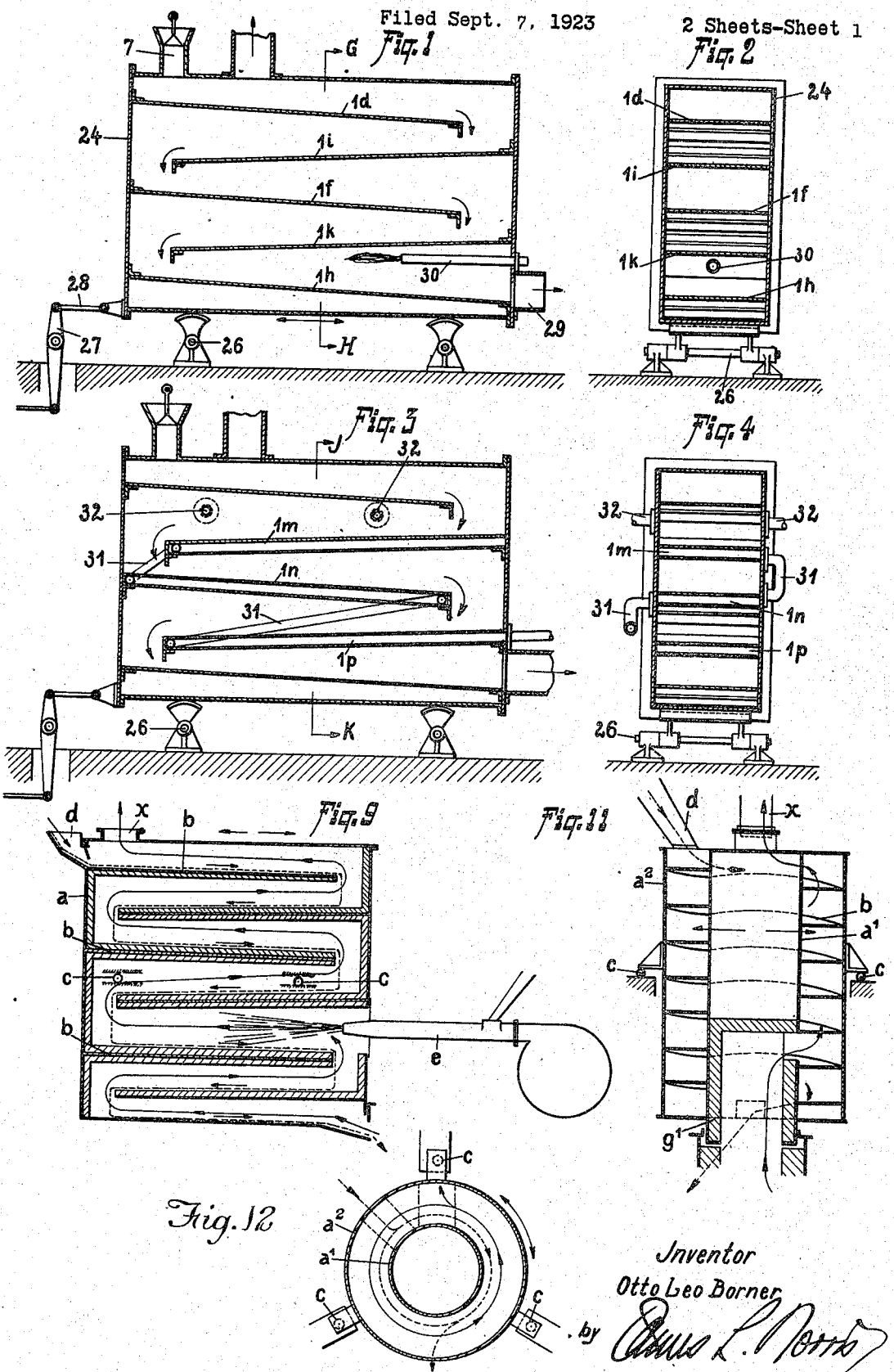
Inventor
Otto Leo Borner
by *Oscar L. Norris*
Attorney Dec. 14, 1926. 1,611,098
O. L. BORNER
METHOD AND MEANS FOR TREATING GRANULATED MATERIAL
Filed Sept. 7, 1923   2 Sheets-Sheet 2
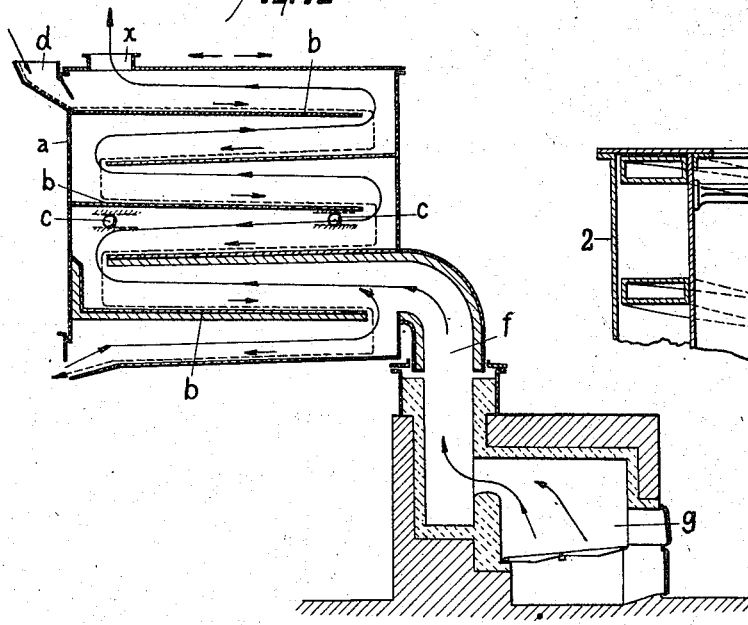
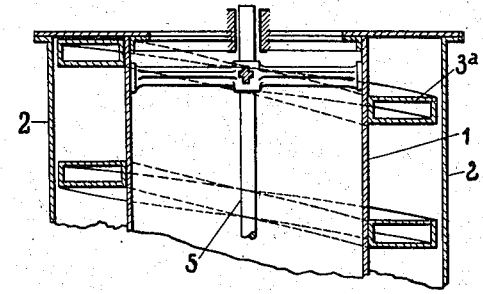
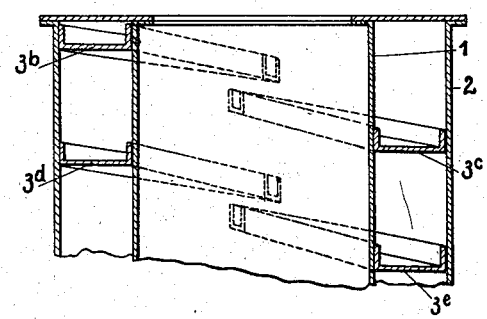
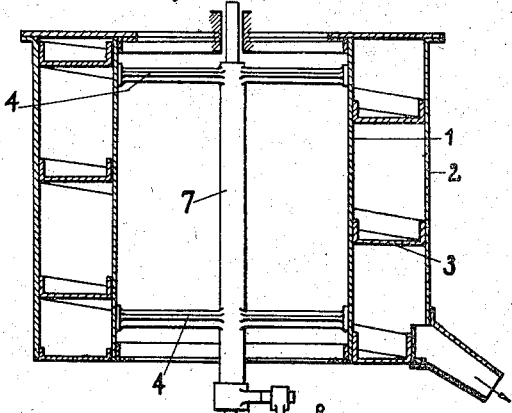
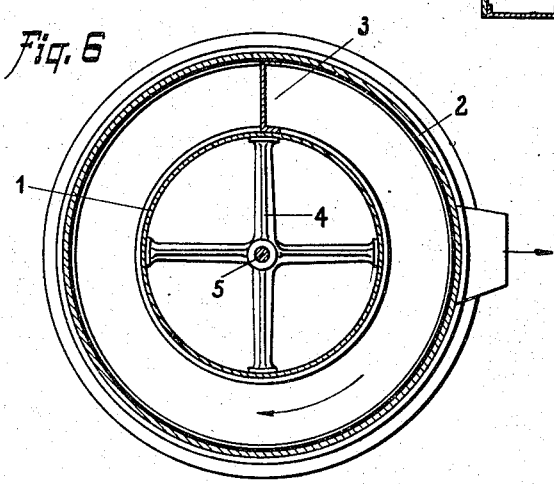
Inventor
Otto Leo Borner
by
Attorney Patented Dec. 14, 1926.

1,611,098

UNITED STATES PATENT OFFICE.

OTTO LEO BORNER, OF ZURICH, SWITZERLAND, ASSIGNOR OF ONE-HALF TO ADOLF BORNER, OF WALLENSTADT, SWITZERLAND.

METHOD AND MEANS FOR TREATING GRANULATED MATERIAL.

Application filed September 7, 1923, Serial No. 661,512, and in Germany September 14, 1922.

Hitherto it has been customary, in some cases for the purpose of drying, roasting or otherwise treating materials of granulated or pulverized shape to move such materials in a zig-zag path by means of rakes and the like over plates made of box section for the purpose of heating the material thereon, or the casing, which had a horizontal shaft was given an oscillatory motion vertical to such shaft and to the path of the material and the shape of the surface over which the material moved was concave. Further, it has been customary in other cases to form a conduit of plates arranged in zig-zag fashion in a casing which was given vertical motion and the wedge shaped spaces left between the bends of the conduit were provided with heating arrangements. Constructions consisting of a series of heated drying shelves set in motion similar to the motion of a trough conveyor, are also known.

All these arrangements have disadvantages. In the first case moving parts of the apparatus are arranged in the same space which contains the material to be treated and these parts are thus subjected to the influence of dampness, heat, dust etc. and suffer correspondingly. In the second case described it is necessary that the planes be arranged at a somewhat acute angle in order to make it possible for the material to be set in motion. Considerable space is wasted thereby. It is further to be observed that, with reference to a section transverse to the main movement of the material a pronounced mixing action takes place which makes it impossible, for example, to treat the centre portion of the material differently from that portion which moves at the edges. It is therefore impossible to unequivocally define the treatment of the moving material. In the third case, it is necessary to arrange the planes over which the material travels at acute angles. Also, the heating of the wedge shaped spaces does not permit a continuous stream of the heating medium for example heated air. Finally, if only a single trough conveyor were provided this would have to be of excessive length if it were to have the desired effect.

All these disadvantages are avoided by the method and apparatus forming the subject-matter of the present invention.

According to this invention the material to be treated is caused to move over plates arranged one above the other, in a casing, which is given oscillatory motion in the direction of the path of the material similar to the motion of trough conveyors, or, the plates are given oscillatory motion in a fixed casing, in which they are, however, so arranged that they also form conduits closed on all sides and connected together whilst the thermical or chemical means for treating the material are moving in the same system of conduits or in a separate system in the opposite direction to the moving materials. The surfaces over which the materials move may be planes so arranged that the material moves in the form of a cascade or they may be of helical shape. In the first case the path of the oscillatory movement as viewed from above is a straight line, in the second case it is part of a circle.

In the drawing various constructions are shown diagrammatically whereby the invention can be put into effect.

Fig. 1 shows a vertical section of an apparatus wherein the path of movement is a straight line.

Fig. 2 is a section on the line G H of Fig. 1.

Figs. 3 and 4 are views of modifications embodying with box shaped plates whereof Fig. 4 is a section on the line J K of Fig. 3.

Figs. 5 and 6 are vertical and horizontal sections respectively of an apparatus employing helical plates.

Fig. 7 is a modification employing with covered conduits.

Fig. 8 is a sectional view of an apparatus wherein the plates are arranged in staggered relation.

Fig. 9 is a vertical section of a modified form of the apparatus.

Fig. 10 is a view similar to Fig. 9 but showing a fire-grate as the means for producing the heat.

Figs. 11 and 12 show the vertical and horizontal section of a cylindrically shaped apparatus.

Referring to Figs. 1 and 2; 24 represents a casing which rests on segments mounted to rock on shafts 26. The segments are horizontally oscillated on the shafts 26 by means of a lever 27 and a connecting rod 28. Plates $1^d$, $1^i$, $1^f$, $1^k$, and $1^h$, are alternately fixed on the front and back wall of the casing 24 and these plates are also fitted closely against the side walls of the casing. The material to be treated is fed into the apparatus at 7 and leaves it at 29. A heating means 30 is provided, which may be in the form of a nozzle for hot air, steam or gas or an arrangement for producing either of these. The top of the casing 24 contains an outlet for air, steam, gases etc.

The plates need be inclined only to a slight extent, that is to say, may be substantially horizontal, as understood in the case of trough conveyors.

A second arrangement is shown in Figs. 3 and 4. The plates $1^n$, $1^m$, and $1^p$ are box-like in cross section and the hollow spaces which may be used for the passage of a heating medium or the like are interconnected by conduits 31. This arrangement will be of advantage in cases where heating media and material under treatment may not intermingle. Chemical gases or the like may be admitted or led away through tubes 32.

In Figs. 5 and 6 an inner drum 1 is shown as arranged in an outer casing 2. In the annular space so formed is arranged a helical plate 3, which has close contact with the two drums 1 and 2. The helical plate may be of the single or multiple thread type. The shaft 7 is fixed to the inner drum 1 by means of arms 4. The whole apparatus may be given horizontal motion by means of crank 8, whereby the centre of gravity of the whole system may be at rest or may make a prescribed movement. For instance, the shaft 7 may be hollow and movable on the shaft 5, so that the whole system not only is in oscillation horizontally but also vertically.

According to Fig. 7, the plates 3 which are also fitted between the cylinders 1 and 2 are covered by a plate $3^a$.

In Fig. 8 an arrangement is shown where the plates are divided into sections $3^b$, $3^c$, $3^d$, $3^e$, which together may form a single or multiple thread.

The materials to be treated are fed on to the uppermost part of the plates and are caused to travel in a downward direction by the oscillatory motion of the whole arrangement and at the same time chemical or thermical mediæ are caused to move in the opposite direction. According to Figs. 1, 2, 5, 6, and 8, the treatment is a direct one, whereas, according to Figs. 3, 4, and 7 it is an indirect one.

Fig. 9 shows a constructional development of Figs. 1 and 2 in the form of a furnace for burning, roasting, and similar purposes. The casing $a$ rests on balls $c$ on which it can move to and fro. The plates $b$ and the casing $a$ are made of fire resisting material or covered with such material. The material to be treated is fed into the apparatus at $d$. By aid of a nozzle $e$ or the like, oil or pulverised coal for combustion are delivered within the apparatus. The gases leave the apparatus at $x$.

Fig. 10 shows an arrangement similar to that shown in Fig. 9, but with a fire grate $g$ built underneath the casing. The gases from the furnace enter the casing at $f$.

Figs. 11 and 12 show a cylindrical apparatus which contains a fire grate $g$ and wherein the plates $b'$ are arranged between the drums $a'$ and $a^2$. The whole casing rests on balls $c$. The material is fed into the casing at $d$ and the gases leave it at $x$.

Claims.

1. The method of drying, roasting, burning, or otherwise thermically or chemically treating pulverized or granulated materials which comprises causing the material under treatment to move over superimposed plates having an oscillatory motion in the direction of the path of movement of the material under treatment and forming interconnected conduits closed on all sides, and concurrently causing media for acting on the material to travel in a path opposite to that in which the material under treatment moves.

2. Means for carrying into effect the method according to claim 1 comprising a casing, means therein forming a conduit having superimposed portions, said conduit being closed on all sides, means for imparting an oscillatory motion to said conduit-forming means in the direction of the path of the material under treatment, and means for causing media used for thermical or chemical treatment of the material to move in the path of the material under treatment.

3. Means according to claim 2 wherein the conduit-forming means is spirally arranged.

In testimony whereof I have hereunto set my hand.

OTTO LEO BORNER.